United States Patent
Qiu et al.

(10) Patent No.: US 10,973,181 B2
(45) Date of Patent: Apr. 13, 2021

(54) TELESCOPIC JACKING STEPWISE ROLLBACK-TYPE REEL SPRINKLING IRRIGATION MACHINE

(71) Applicants: JIANGSU HUAYUAN WATER-SAVING CO., LTD, Jiangsu (CN); China University of Mining and Technology, Jiangsu (CN)

(72) Inventors: Zhipeng Qiu, Jiangsu (CN); Tao Peng, Jiangsu (CN); Peiyong Liu, Jiangsu (CN); Jinxiang Zhang, Jiangsu (CN); Zhencai Zhu, Jiangsu (CN); Fan Jiang, Jiangsu (CN)

(73) Assignees: JIANGSU HUAYUAN WATER-SAVING CO., LTD, Jiangsu (CN); China University of Mining and Technology, Jiangsu (CN)

( * ) Notice: Subject to any disclaimer, the term of this patent is extended or adjusted under 35 U.S.C. 154(b) by 88 days.

(21) Appl. No.: 16/340,379

(22) PCT Filed: Jun. 25, 2018

(86) PCT No.: PCT/CN2018/092574
§ 371 (c)(1),
(2) Date: Apr. 8, 2019

(87) PCT Pub. No.: WO2019/105025
PCT Pub. Date: Jun. 6, 2019

(65) Prior Publication Data
US 2020/0281135 A1 Sep. 10, 2020

(30) Foreign Application Priority Data
Nov. 30, 2017 (CN) .......................... 201711239826.3

(51) Int. Cl.
*A01G 25/09* (2006.01)
*B65H 75/42* (2006.01)
*B65H 75/44* (2006.01)

(52) U.S. Cl.
CPC .......... *A01G 25/095* (2013.01); *B65H 75/425* (2013.01); *B65H 75/4481* (2013.01); *B65H 2701/33* (2013.01)

(58) Field of Classification Search
CPC .... A01G 25/09; A01G 25/092; A01G 25/095; B65H 75/425; B65H 75/4481; B65H 2701/33
(Continued)

(56) References Cited

U.S. PATENT DOCUMENTS 4,174,809 A * 11/1979 Arlemark ............. A01G 25/095
137/355.2
4,186,881 A * 2/1980 Long .................... A01G 25/095
137/355.12
(Continued)

FOREIGN PATENT DOCUMENTS

| CN | 105104115 | 12/2015 |
|---|---|---|
| CN | 105475097 | 4/2016 |

(Continued)

*Primary Examiner* — Tuongminh N Pham
*Assistant Examiner* — Juan C Barrera
(74) *Attorney, Agent, or Firm* — JCIPRNET

(57) ABSTRACT

The present invention provides a telescopic jacking stepwise rollback-type reel sprinkling irrigation machine, including a chassis, a locking-type reel, a sprinkling irrigation apparatus, and a stepwise driving apparatus. A locking channel in a circumferential direction is disposed on the locking-type reel. The stepwise driving apparatus includes a lifting cylinder, an upper caliper, and a lower caliper, and the upper caliper and the lower caliper are clamped to be mounted on the locking channel. Pressurized water is used in the telescopic jacking stepwise rollback-type reel sprinkling irriga- (Continued)

tion machine to drive the lifting cylinder to realize periodic lifting motion of the piston rod, so as to drive the upper caliper to move up and down to be engaged with the locking channel of the locking-type reel intermittently, thereby driving the locking-type reel to roll back intermittently to automatically reel in a sprinkling irrigation PE hose.

20 Claims, 8 Drawing Sheets

(58) Field of Classification Search
  USPC .......................................................... 239/736
  See application file for complete search history.

(56) References Cited

U.S. PATENT DOCUMENTS

| | | | | |
|---|---|---|---|---|
| 4,232,826 A | * | 11/1980 | Broughton | A01G 25/095 |
| | | | | 239/112 |
| 4,306,682 A | * | 12/1981 | Toussaint | A01G 25/095 |
| | | | | 239/745 |
| 4,445,643 A | * | 5/1984 | Thorsby | A01G 25/095 |
| | | | | 137/355.2 |
| 4,538,761 A | * | 9/1985 | Ruprechter | A01G 25/095 |
| | | | | 137/355.19 |
| 5,711,490 A | * | 1/1998 | Hansinger | A01G 25/095 |
| | | | | 239/197 |

FOREIGN PATENT DOCUMENTS

| | | |
|---|---|---|
| CN | 107853141 | 3/2018 |
| CN | 207561036 | 7/2018 |
| GB | 2233311 | 1/1991 |

\* cited by examiner

TELESCOPIC JACKING STEPWISE ROLLBACK-TYPE REEL SPRINKLING IRRIGATION MACHINE

CROSS-REFERENCE TO RELATED APPLICATION

This is a 371 application of the International PCT application serial no. PCT/CN2018/092574, filed on Jun. 25, 2018, which claims the priority benefits of China Application No. 201711239826.3, filed on Nov. 30, 2017. The entirety of each of the above-mentioned patent applications is hereby incorporated by reference herein and made a part of this specification.

FIELD OF THE INVENTION

The present invention relates to a reel sprinkling irrigation machine, and specifically, to a telescopic jacking stepwise rollback-type reel sprinkling irrigation machine suitable for sprinkling irrigation of a landscape architecture, and belongs to the technical field of sprinkling irrigation devices for landscape architectures.

DESCRIPTION OF RELATED ART

A landscape architecture refers to a sightseeing and resting place with a beautiful environment, built by reconstructing a terrain (or further making a hill, stacking stones, and designing water), planting trees and flowers, constructing buildings, and laying out paths using an engineering and artistic means in a certain area. A landscape architecture usually includes grounds, private gardens, small parks, gardens, parks, botanical gardens, and so on. A landscape architecture is used for not only sightseeing and resting, but also for protecting and improving an environment, and actively promotes urban greening and environmental protection.

Sprinkling irrigation is an irrigation method for using a special device such as a sprinkler to sprinkle pressurized water into the air, and forming water drops to fall onto the ground and surface of plants. A sprinkling machine is also referred to as sprinkling equipment or a sprinkler unit, that is, a special device for sprinkling irrigation.

Landscape architectures are mostly irrigated by sprinklers at present. That is, a sprinkler is fixedly mounted and is pre-buried at a fixed position of an underground water delivery pipeline through a connection hose, and sprinkling irrigation water is sprinkled from a sprinkler through a pumping station and a water delivery pipeline, so as to perform fixed-point sprinkling irrigation. Such a conventional sprinkling irrigation manner has the following defects.

1. A water delivery pipeline needs to be pre-buried when a landscape architecture is built. Not only an amount of work is huge, but also a pre-buried water delivery pipeline cannot be maintained easily and cannot be checked easily when a fault or water leakage occurs.

2. A layout of a water delivery pipeline may be influenced by factors such as a shape of a plot of a landscape architecture, a ground slope, and a planting direction of vegetation, causing work to increase virtually.

3. Since a fixed-point sprinkling irrigation manner is used and a single sprinkler covers a limited area, a suitable spacing between sprinklers needs to be set to avoid dead corners of sprinkling irrigation.

4. A pumping station usually needs to be located at a central position of a plot to reduce use of water pipes and loss of water in the water pipes, thereby reducing investment costs and operation costs, but an additional pumping station water pipeline usually needs to be pre-buried for a pumping station that is far away from a water source and cannot be maintained easily either.

5. Due to influence of gravity of sprinkling irrigation water sprinkled from the sprinkler, the quantity of water distributed in the soil in a horizontal direction is reduced gradually from the sprinkler as a center to the outside during a sprinkling irrigation process, the cross-section has a tapered structure, and although a suitable spacing between sprinklers can avoid dead corners of sprinkling irrigation, a phenomenon of non-uniform irrigation and waste of water resources are still caused.

SUMMARY OF THE INVENTION

In view of the foregoing problems, the present invention provides a telescopic jacking stepwise rollback-type reel sprinkling irrigation machine that can reduce water resources, reduce an amount of work, and realize uniform sprinkling irrigation, and is especially suitable for sprinkling irrigation of a landscape architecture.

To achieve the foregoing objective, the telescopic jacking stepwise rollback-type reel sprinkling irrigation machine includes a chassis, a locking-type reel, a sprinkling irrigation apparatus, and a stepwise driving apparatus.

The chassis is a box-shaped support frame structure with a top portion, a bottom portion, and a rear portion open, a support wheel is provided at a rear end of the bottom portion of the chassis, front supports that incline toward a lower forward direction are respectively disposed on left and right sides of a front end of the bottom portion of the chassis, and a holding beam that is disposed in a horizontal direction and fixedly connected to the two front supports is disposed between the two front supports.

The locking-type reel includes a cylinder, wing plates, and reel rotation shafts; the cylinder is a hollow cylindrical structure; the wing plates have a disk-shaped structure, a quantity of the wing plates is set to two, the two wing plates are coaxial with the cylinder respectively and fixedly disposed at two ends of the cylinder, a size of an outer diameter of the wing plates is greater than a size of an outer diameter of the cylinder, opposite inner surfaces of the two wing plates and an outer surface of the cylinder together form an accommodating space for a sprinkling irrigation PE hose, an outer surface of at least one wing plate further has a locking channel protruding from an outer surface of the wing plate, the locking channel is set to be a sealed ring structure along a circumferential edge position of the wing plate, and the ring structure is disposed concentrically with the wing plate; a quantity of the reel rotation shafts is set to two, the reel rotation shafts are coaxially disposed at the central positions of the two wing plates in a left-to-right symmetric mode, the reel rotation shafts have a hollow sleeve structure, and the locking-type reel is set to roll back and forth and is mounted on the chassis through the reel rotation shafts.

The sprinkling irrigation apparatus includes a sprinkling irrigation PE hose, a pressurized water axial end input joint, a sprinkler support mechanism, and a sprinkler; the pressurized water axial end input joint is a three-way structure that includes an input end and two output ends, one output end of the pressurized water axial end input joint is coaxially fixed and mounted at an axial end of one reel rotation shaft of the locking-type reel; the sprinkling irrigation PE hose is wound on the cylinder of the locking-type reel, an input end of the sprinkling irrigation PE hose penetrates into the cylinder of the locking-type reel and is connected to and is in communication with an output end of the pressurized water axial end input joint, and the output end of the sprinkling irrigation PE hose extends out from a top of the holding beam of the chassis; the sprinkler includes a sprinkler connection hose mounted on the sprinkler support mechanism in a vertical direction and a sprinkler head mounted at a top of the sprinkler connection hose, and a bottom end of the sprinkler connection hose of the sprinkler is connected to and is in communication with the output end of the sprinkling irrigation PE hose.

The stepwise driving apparatus includes a lifting cylinder, an upper caliper, and a lower caliper.

The lifting cylinder is fixedly mounted at a rear end of the chassis at a position corresponding to the locking channel, and the lifting cylinder includes a cylinder body and a piston rod; a piston integrally formed with the piston rod is disposed at a bottom end of the piston rod, a size of an outer diameter of the piston fits in with a size of an inner diameter of the cylinder body, a rod body of the piston rod fits in with a size of a cylinder mouth at a top end of the cylinder body, the piston rod is mounted inside the cylinder body and divides a cavity of the cylinder body into an upper small cavity and a lower large cavity, a water inlet opening penetrating through an outer wall of the cylinder body is formed at the top of the small cavity in a radial direction of the cylinder body, the water inlet opening is connected to and is in communication with the other output end of the pressurized water axial end input joint through a pipeline; a cylinder bottom water release seat that extends downwards is disposed on a cylinder bottom base plane of the cylinder body, a cylinder bottom water release hole that penetrates through the cylinder bottom water release seat and is in communication with the large cavity is disposed on the cylinder bottom water release seat; a pallet is disposed at a top end of the rod body of the piston rod, and a channel I that penetrates the rod body in a radial direction is disposed under the rod body of the piston rod and above the piston; a valve rod penetrates through and is disposed inside the piston rod in an axial direction of the piston rod at a position corresponding to the cylinder bottom water release hole, and the valve rod penetrates through the channel I, a guiding boss of which a size of an outer diameter is greater than that of a rod body of the valve rod is disposed at a top end of the valve rod, the guiding boss of the valve rod fits in with a size of an inner diameter of a valve rod guiding hole located above the channel I and disposed along an axial direction of the piston rod, the valve rod slidably fits in with a valve rod guiding hole through the guiding boss, a blocking member is coaxially mounted at a bottom end of the valve rod, and a size of an outer diameter of a base plane of the blocking member is greater than a size of an inner diameter of the cylinder bottom water release hole; a force accumulating spring is further disposed in the valve rod guiding hole, a top end of the force accumulating spring presses against the guiding boss of the valve rod, and a bottom end presses inside the rod body of the piston rod; a large cavity water inlet opening is further disposed in a base plane of the piston at a position corresponding to the cylinder bottom water release hole, the large cavity water inlet opening is in communication with the small cavity through a channel II, a size of an inner diameter of the large cavity water inlet opening is less than a size of an outer diameter of a top plane of the blocking member, and the large cavity water inlet opening, the valve rod, and the cylinder bottom water release hole are disposed coaxially.

The upper caliper is disposed in a front-to-back direction and mounted between the lifting cylinder and the locking channel, the upper caliper includes a bayonet portion and a pallet portion, the bayonet portion includes a bayonet that is disposed along a left-to-right opening and clamped in the locking channel, a width size of the bayonet is in clearance fit with a thickness size of the locking channel, the pallet portion is a lengthwise plank structure disposed in a back-to-forth direction, a front end of the pallet portion is fixedly connected to the bayonet portion, and a rear end is in butt joint of the pallet of the piston rod.

A structure of the lower caliper is the same as a structure of the upper caliper and the lower caliper is located exactly below the upper caliper, a bayonet of the bayonet portion of the lower caliper is clamped on the locking channel, and a rear end of the pallet portion of the lower caliper is in butt joint of the chassis.

In a further improved solution of the present invention, the water inlet opening is connected to and is in communication with the other output end of the pressurized water axial end input joint through a pipeline and a filter.

In a further improved solution of the present invention, the large cavity water inlet opening, the valve rod, and the cylinder bottom water release hole are coaxially disposed at a position of an axial line of the piston rod, and the channel II is disposed between the channel I and the piston.

In a further improved solution of the present invention, a pressure gauge and a flow adjustment valve are disposed at an input end of the pressurized water axial end input joint.

In a further improved solution of the present invention, the stepwise driving apparatus further includes a rollback automatic stopping mechanism, the rollback automatic stopping mechanism includes a limiting swing retaining frame, a transmission connecting rod or a wire rope, and a swing holding rod, the limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

In a further improved solution of the present invention, the sprinkling irrigation apparatus further includes a pipe row mechanism, and the pipe row mechanism includes a forward and backward 8-shaped spiral shaft and a pipe row sleeve; the forward and backward 8-shaped spiral shaft is set at a front end of the chassis horizontally in a left-to-right direction and is located above the holding beam, and the forward and backward 8-shaped spiral shaft is connected to chains of the reel rotation shafts of the locking-type reel 2 in a transmission manner through a transmission chain; the pipe row sleeve is sleeved over the forward and backward 8-shaped spiral shaft, and the output end of the sprinkling irrigation PE hose passes through a U-shaped connection member disposed on the pipe row sleeve to be connected to and in communication with a bottom end of the sprinkler connection hose on the sprinkler.

In a further improved solution of the present invention, the sprinkling irrigation apparatus further includes a pressurized pipe mechanism; the pressurized pipe mechanism includes a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction; one end of the tension spring is connected to the portal frame structure of the pressurized pipe frame and the other end is connected to a side wall of the chassis.

In a further improved solution of the present invention, a flow adjustment valve is disposed on the pressurized water input joint of the water turbine box, the pressurized pipe mechanism is disposed behind the locking-type reel, and a hinged shaft at the bottom end of the pressurized pipe frame is connected to the flow adjustment valve through a connection rod mechanism.

In an implementation of the sprinkler support mechanism of the present invention, the sprinkler support mechanism is a holding plate structure that is horizontal or leans forward.

In another implementation of the sprinkler support mechanism of the present invention, the sprinkler support mechanism is a sprinkler wagon structure.

Compared with the prior art, pressurized water is used in the telescopic jacking stepwise rollback-type reel sprinkling irrigation machine to drive the lifting cylinder to realize periodic lifting motion of the piston rod, so as to drive the upper caliper to move up and down to be engaged with the locking channel of the locking-type reel intermittently, thereby driving the locking-type reel to roll back intermittently to automatically reel in a sprinkling irrigation PE hose, and during an intermittent rollback process of the locking-type reel, the lower caliper can prevent the locking-type reel from reversing. The whole structure is simple, may perform sprinkling irrigation on vegetation of a landscape architecture conveniently, and may be used flexibly and maintained easily. A water delivery pipeline does not need to be pre-buried in a sprinkling irrigation area of a landscape architecture and problems such as a spacing between sprinklers do not need to be considered. The self-moving sprinkling irrigation manner may realize horizontal and uniform distribution of water resources in sprinkled and irrigated soil in a precondition of reducing water resources, ensure uniform irrigation, reduce an amount of work of construction of a landscape architecture, and reduce construction costs, and is especially suitable for sprinkling irrigation of a landscape architecture.

Reference numbers in the figures: 1: Chassis; 2: locking-type reel; 21: locking channel; 3: sprinkling irrigation apparatus; 32: pressurized water axial end input joint; 33: sprinkler support mechanism; 34: Sprinkler; 35: pipe row mechanism; 36: pressurized pipe mechanism; 4. stepwise driving apparatus; 41 lifting cylinder; 411: cylinder body; 412: piston rod; 413: valve rod guiding hole; 414: channel I; 415: valve rod; 416: blocking member; 417: force accumulating spring; 418: channel II; 419: water inlet opening; 42: upper caliper; 43: lower caliper; 45: limiting swing retaining frame; 46 swing holding rod.

DETAILED DESCRIPTION OF THE INVENTION

The present invention is further described with reference to the accompanying drawings (a direction of pulling out a sprinkling irrigation PE hose is considered as a forward direction).

Figure 1:
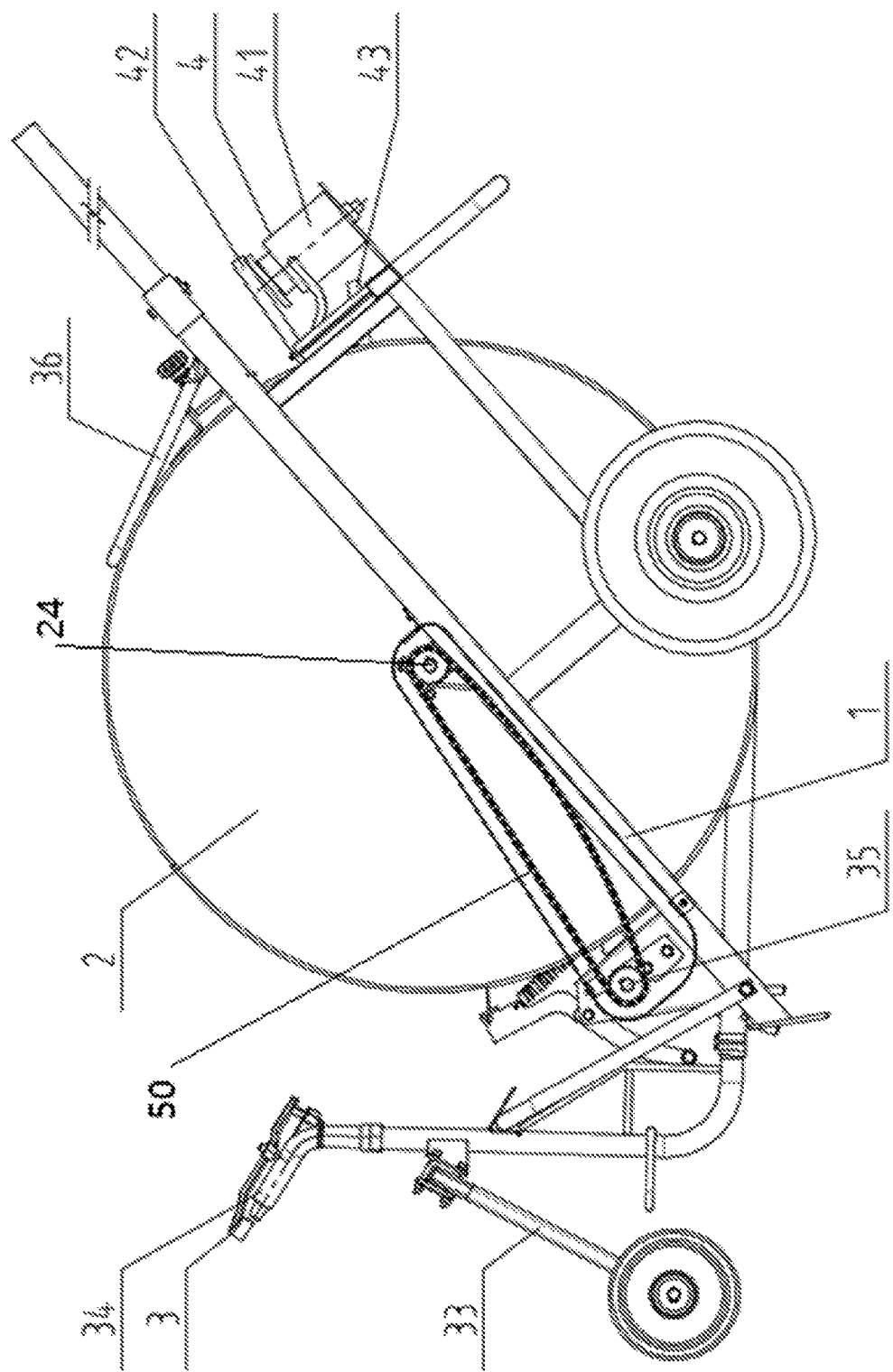
FIG. 1 is a schematic structural diagram of the present invention.
Figure 2:
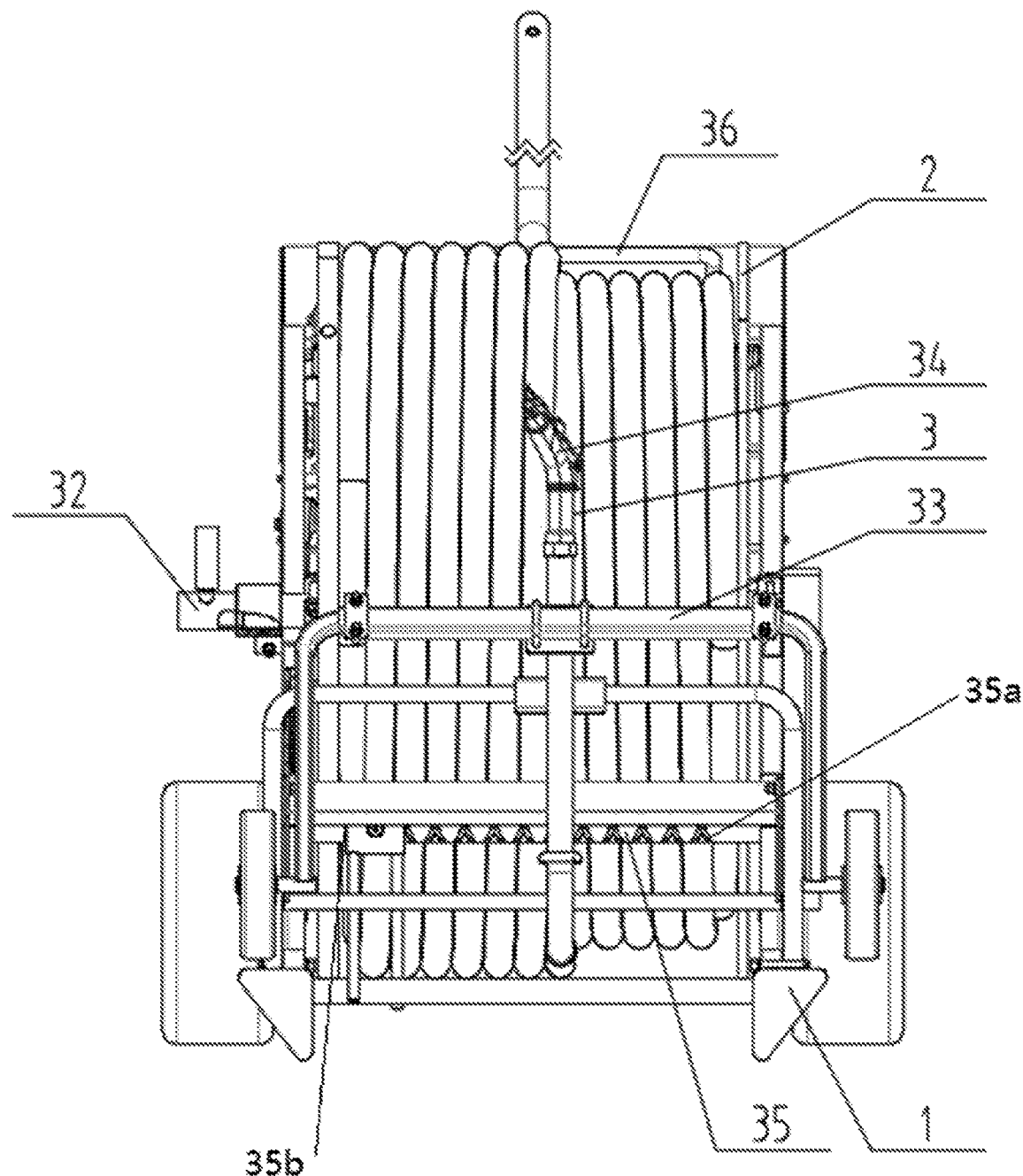
FIG. 2 is a left view of FIG. 1.
Figure 3:
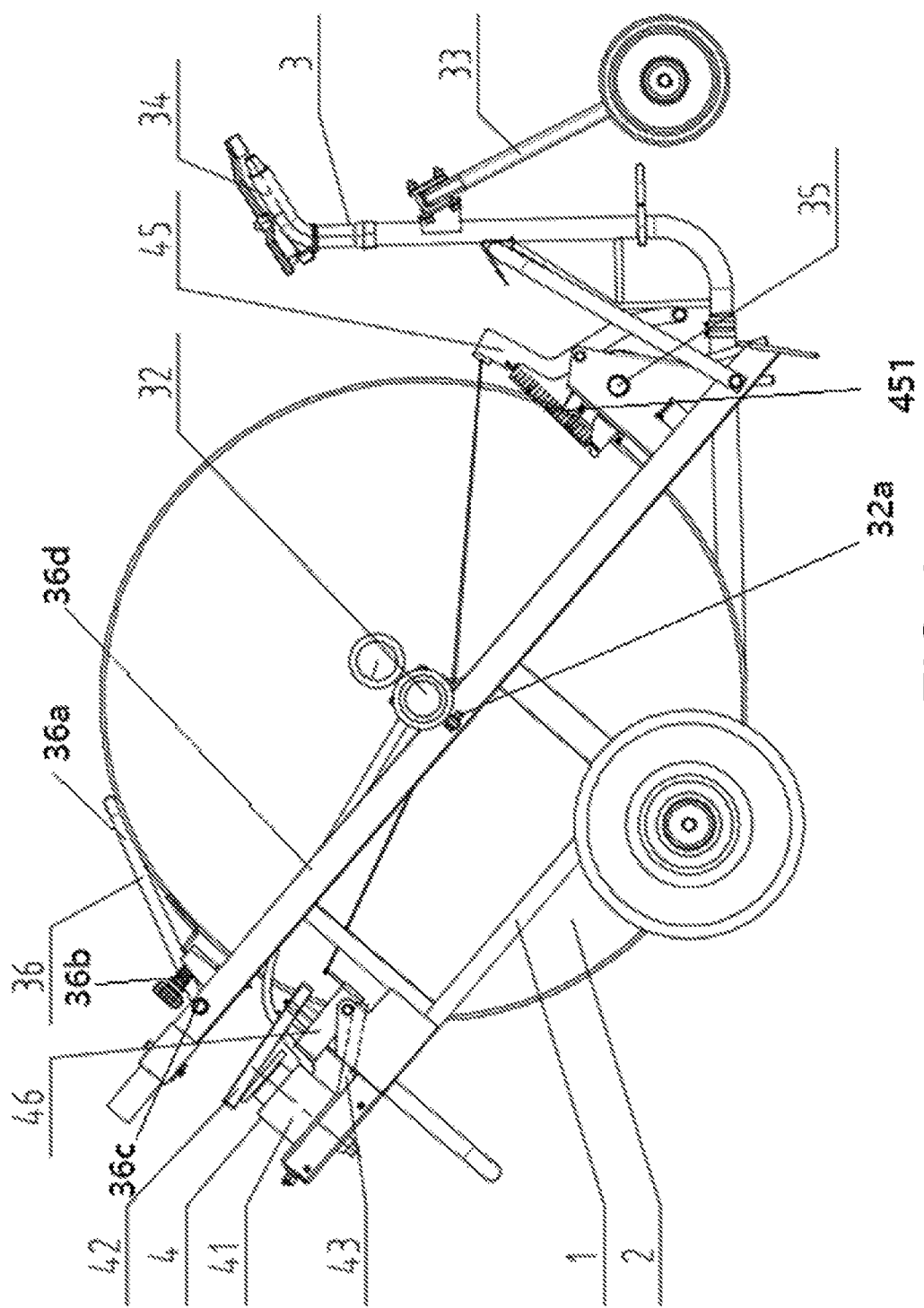
FIG. 3 is a rear view of FIG. 1.

As shown in FIG. 1, FIG. 2, and FIG. 3, the telescopic jacking stepwise rollback-type reel sprinkling irrigation machine includes a chassis 1, a locking-type reel 2, a sprinkling irrigation apparatus 3, and a stepwise driving apparatus 4.

The chassis 1 is a box-shaped support frame structure with a top portion, a bottom portion, and a rear portion open, a support wheel is provided at a rear end of the bottom portion of the chassis 1, front supports that incline toward a lower forward direction are respectively disposed on left and right sides of a front end of the bottom portion of the chassis 1, and a holding beam that is disposed in a horizontal direction and fixedly connected to the two front supports is disposed between the two front supports.

Figure 8:
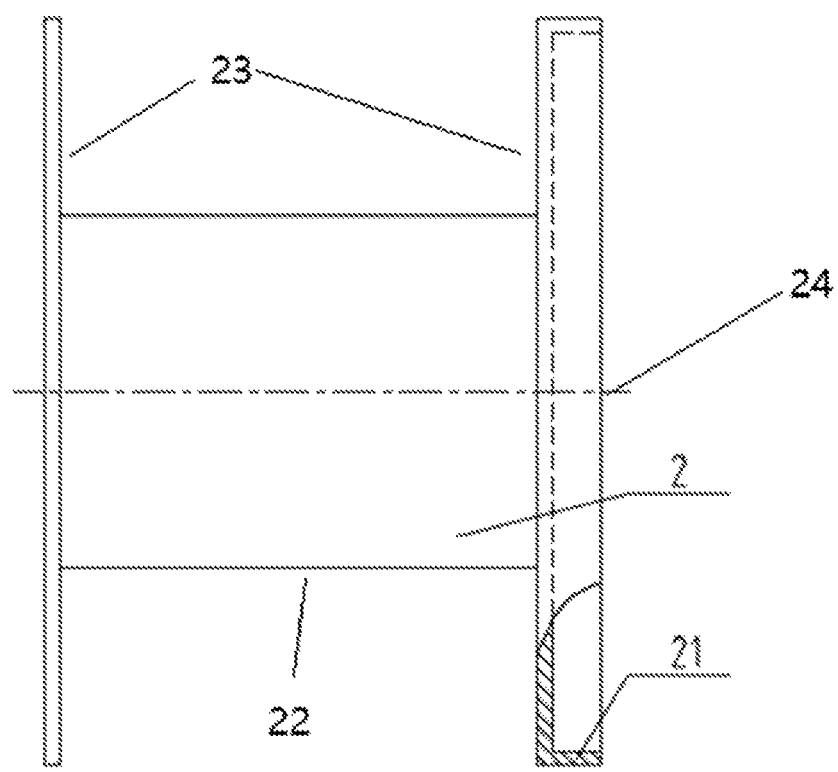
FIG. 8 is a schematic structural diagram of the locking-type reel according to the present invention.

The locking-type reel 2 includes a cylinder 22, wing plates 23, and reel rotation shafts; the cylinder 22 is a hollow cylindrical structure; the wing plates 23 have a disk-shaped structure, a quantity of the wing plates 23 is set to two, the two wing plates 23 are coaxial with the cylinder 22 respectively and fixedly disposed at two ends of the cylinder 22, a size of an outer diameter of the wing plates 23 is greater than a size of an outer diameter of the cylinder 22, opposite inner surfaces of the two wing plates 23 and an outer surface of the cylinder 22 together form an accommodating space for a sprinkling irrigation PE hose, as shown in FIG. 8, an outer surface of at least one wing plate 23 further has a locking channel 21 protruding from an outer surface of the wing plate 23, the locking channel 21 is set to be a sealed ring structure along a circumferential edge position of the wing plate 23, and the ring structure is disposed concentrically with the wing plate 23; a quantity of the reel rotation shafts 24 is set to two, the reel rotation shafts 24 are coaxially disposed at the central positions of the two wing plates 23 in a left-to-right symmetric mode, the reel rotation shafts 24 have a hollow sleeve structure, and the locking-type reel 2 is set to roll back and forth and is mounted on the chassis 1 through the reel rotation shafts 24.

The sprinkling irrigation apparatus 3 includes a sprinkling irrigation PE hose, a pressurized water axial end input joint 32, a sprinkler support mechanism 33, and a sprinkler 34; the pressurized water axial end input joint 32 is a three-way structure that includes an input end and two output ends, one output end of the pressurized water axial end input joint 32 is coaxially fixed and mounted at an axial end of one reel rotation shaft 24 of the locking-type reel 2; the sprinkling irrigation PE hose is wound on the cylinder 22 of the locking-type reel 2, an input end of the sprinkling irrigation PE hose penetrates into the cylinder 22 of the locking-type reel 2 and is connected to and is in communication with the output end of the pressurized water axial end input joint 32, and an output end of the sprinkling irrigation PE hose extends out from a top of the holding beam of the chassis 1; the sprinkler 34 includes a sprinkler connection hose mounted on the sprinkler support mechanism 33 in a vertical direction and a sprinkler head mounted at a top of the sprinkler connection hose, and a bottom end of the sprinkler connection hose of the sprinkler 34 is connected to and is in communication with the output end of the sprinkling irrigation PE hose.

The stepwise driving apparatus includes a lifting cylinder 41, an upper caliper 42, and a lower caliper 43.

Figure 4:
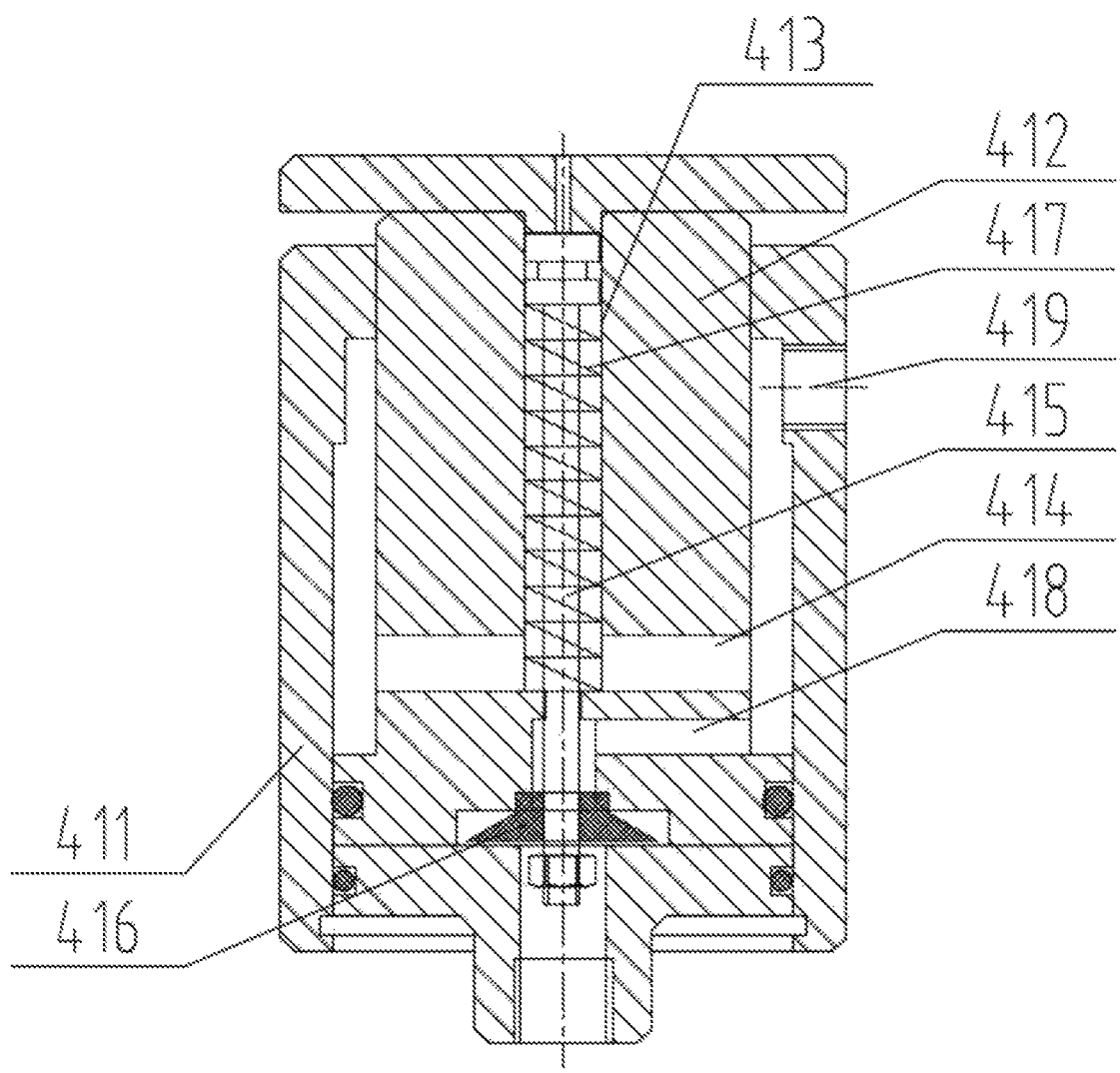
FIG. 4 is a schematic structural diagram of the lifting cylinder according to the present invention.

The lifting cylinder 41 is fixedly mounted at a rear end of the chassis at a position corresponding to the locking channel 21, and as shown in FIG. 4, the lifting cylinder 41 includes a cylinder body 411 and a piston rod 412; a piston integrally formed with the piston rod 412 is disposed at a bottom end of the piston rod 412, a size of an outer diameter of the piston fits in with a size of an inner diameter of the cylinder body 411, a rod body of the piston rod 412 fits in with a size of a cylinder mouth at a top end of the cylinder body 411, the piston rod 412 is mounted inside the cylinder body 411 and divides a cavity of the cylinder body into an upper small cavity and a lower large cavity, a water inlet opening 419 penetrating through an outer wall of the cylinder body 411 is formed at the top of the small cavity in a radial direction of the cylinder body 411, the water inlet opening 419 is connected to and is in communication with the other output end of the pressurized water axial end input joint 32 through a pipeline; a cylinder bottom water release seat that extends downwards is disposed on a cylinder bottom base plane of the cylinder body 411, a cylinder bottom water release hole 420 that penetrates through the cylinder bottom water release seat and is in communication with the large cavity is disposed on the cylinder bottom water release seat; a pallet is disposed at a top end of the rod body of the piston rod 412, and a channel I 414 that penetrates the rod body in a radial direction is disposed under the rod body of the piston rod 412 and above the piston; a valve rod 415 penetrates through and is disposed inside the piston rod 412 in an axial direction of the piston rod 412 at a position corresponding to the cylinder bottom water release hole 420, and the valve rod 415 penetrates through the channel I 414, a guiding boss 421 of which a size of an outer diameter is greater than that of a rod body of the valve rod 415 is disposed at a top end of the valve rod 415, the guiding boss 421 of the valve rod 415 fits in with a size of an inner diameter of a valve rod guiding hole 413 located above the channel I 414 and disposed along an axial direction of the piston rod 412, the valve rod 415 slidably fits in with a valve rod guiding hole 413 through the guiding boss 421, a blocking member 416 is coaxially mounted at a bottom end of the valve rod 415, and a size of an outer diameter of a base plane of the blocking member 416 is greater than a size of an inner diameter of the cylinder bottom water release hole 420; a force accumulating spring 417 is further disposed in the valve rod guiding hole 413, a top end of the force accumulating spring 417 presses against the guiding boss 421 of the valve rod 415, and a bottom end presses inside the rod body of the piston rod 412; a large cavity water inlet opening 422 is further disposed in a base plane of the piston at a position corresponding to the cylinder bottom water release hole 420, the large cavity water inlet opening 422 is in communication with the small cavity through a channel II 418, a size of an inner diameter of the large cavity water inlet opening 422 is less than a size of an outer diameter of a top plane of the blocking member 416, and the large cavity water inlet opening 422, the valve rod 415, and the cylinder bottom water release hole 420 are disposed coaxially.

Figure 9:
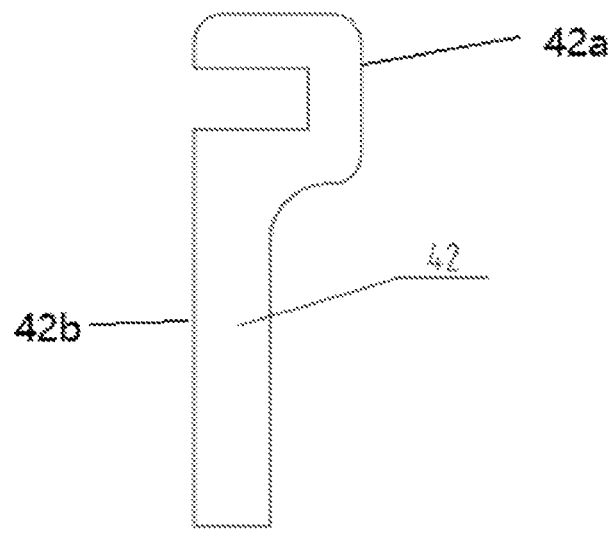
FIG. 9 is a schematic structural diagram of the upper caliper according to the present invention.

The upper caliper 42 is disposed in a front-to-back direction and mounted between the lifting cylinder 41 and the locking channel 21, as shown in FIG. 9, the upper caliper 42 includes a bayonet portion 42a and a pallet portion 42b, the bayonet portion 42a includes a bayonet that is disposed along a left-to-right opening and clamped in the locking channel 21, a width size of the bayonet is in clearance fit with a thickness size of the locking channel 21, the pallet portion 42b is a lengthwise plank structure disposed in a back-to-forth direction, a front end of the pallet portion 42b is fixedly connected to the bayonet portion 42a, and a rear end is in butt joint of the pallet of the piston rod 412.

A structure of the lower caliper 43 is the same as a structure of the upper caliper 42 and the lower caliper 43 is located exactly below the upper caliper 42, a bayonet of the bayonet portion of the lower caliper 43 is clamped on the locking channel 21, and a rear end of the pallet portion of the lower caliper 43 is in butt joint of the chassis 1. The up-and-down reciprocating motion of the piston rod 412 of the lifting cylinder 41 may be controlled to enable the bayonet of the upper caliper 42 to be engaged with the locking channel 21 intermittently and drive the locking-type reel 2 to rotate intermittently as a whole, and the lower caliper 43 can prevent the locking-type reel 2 from reversing.

Figure 5:
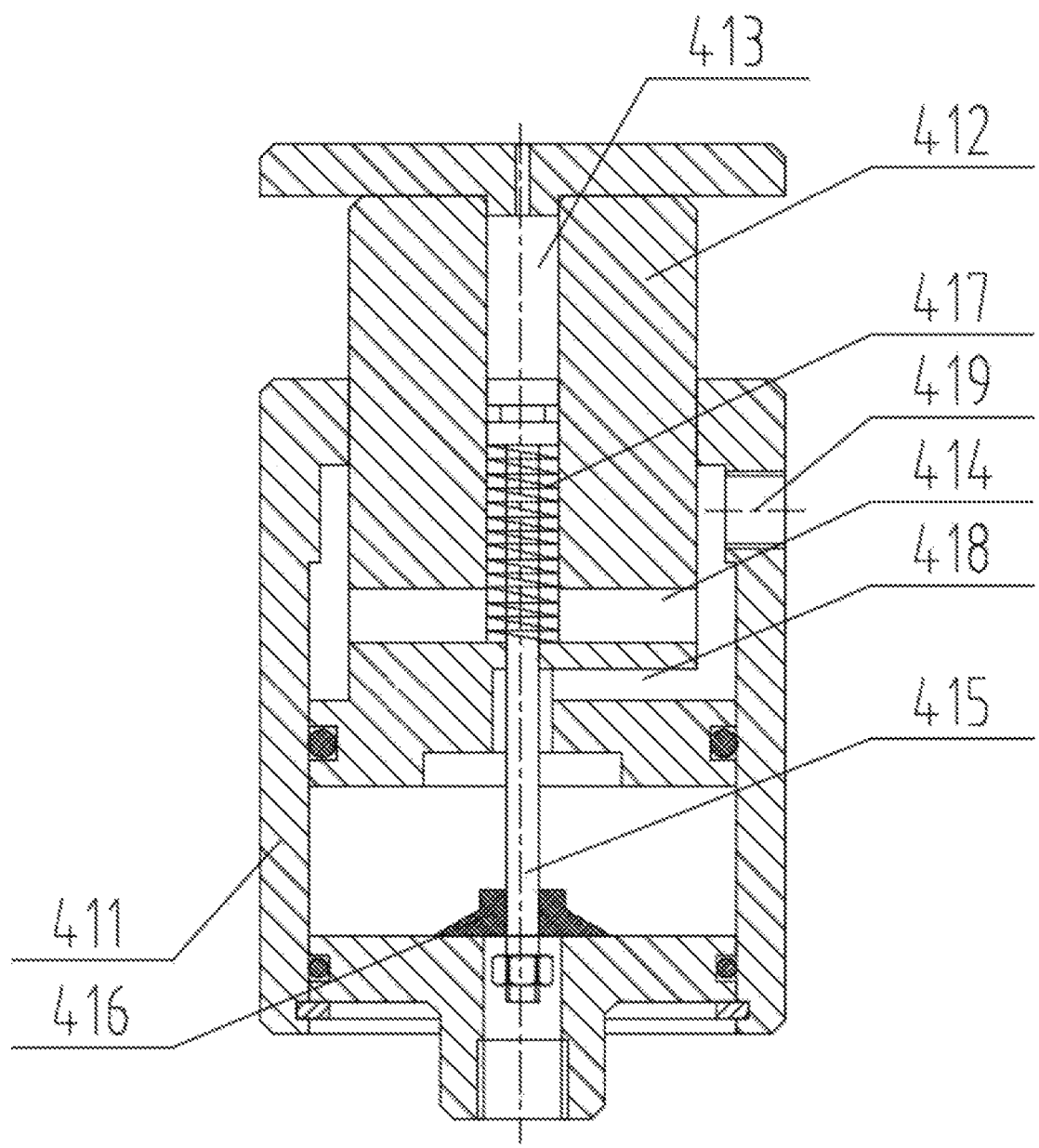
FIG. 5 is a schematic structural diagram of the piston rod 412 of the lifting cylinder in a jacking state according to the present invention.
Figure 6:
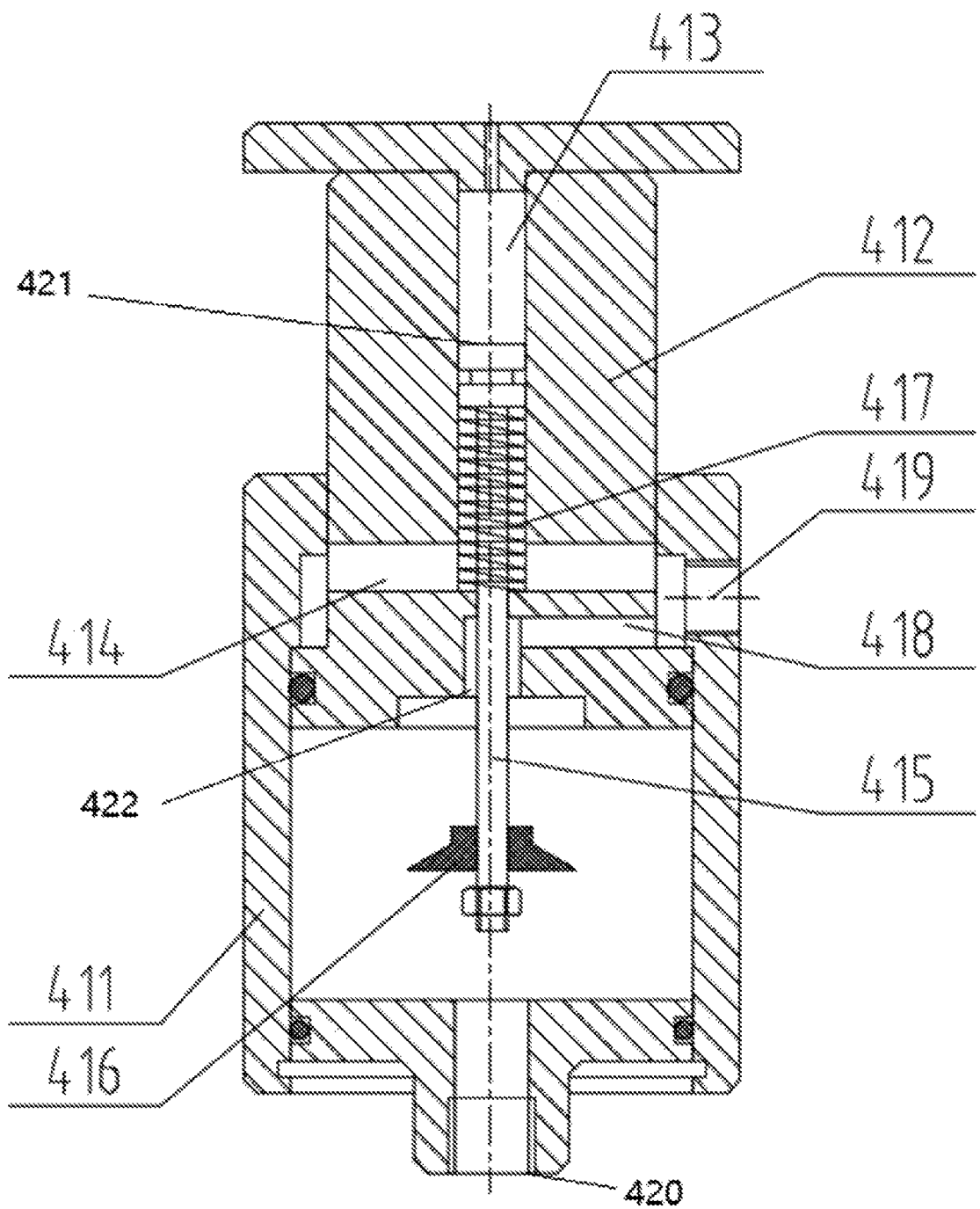
FIG. 6 is a schematic structural diagram of the large cavity of the lifting cylinder in a water release state according to the present invention.
Figure 7:
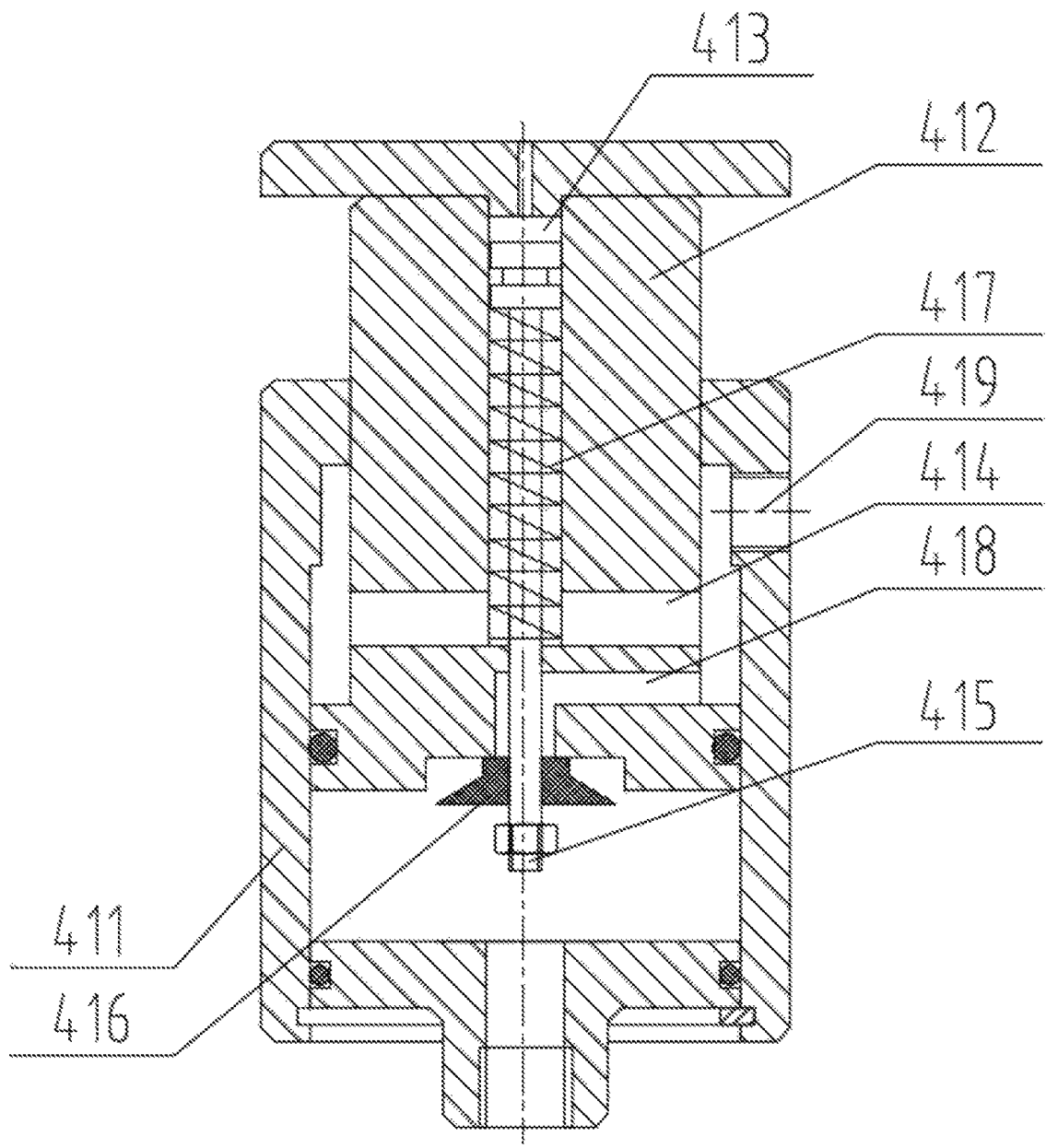
FIG. 7 is a schematic structural diagram of the piston rod 412 of the lifting cylinder in a reset state according to the present invention.

When the telescopic jacking stepwise rollback-type reel sprinkling irrigation machine is in a receiving and transferring state not for sprinkling irrigation, the sprinkling irrigation PE hose is completely wound on the cylinder 22 of the locking-type reel 2, and the lower caliper 43 is in an anti-reversal state for engaging with the locking channel 21. In this case, the rear end of the chassis 1 can be pressed down and pulled so that the front support at the front end of the chassis 1 rises up to leave the ground, so as to be transferred to another place. When a landscape architecture needs a sprinkling irrigation operation, the rear end of the chassis 1 is lifted so that the front supports at the front end of the chassis 1 are inserted into the ground to be stably supported, firstly, the upper caliper 42 and the lower caliper 43 are taken off from the position of the bayonet, secondly, the sprinkler support mechanism 33 is pushed and pulled forward to a position that needs sprinkling irrigation. When the sprinkler support mechanism 33 is moved forward, the locking-type reel 2 rotates to release the sprinkling irrigation PE hose, the upper caliper 42 and the lower caliper 43 are clamped and mounted again to connect an input end of the pressurized water axial end input joint 32 to a pressurized hydrant, the pressurized hydrant is opened, then pressurized water enters the pressurized water axial end input joint 32, one part of the pressurized water enters the sprinkling irrigation PE hose and finally is sprinkled from the sprinkler 34, and the other part of the pressurized water enters the lifting cylinder 41 through the water inlet opening 419. The pressurized water enters the small cavity of the lifting cylinder 41 through the water inlet opening 419, then enters the large cavity to be replenished through the channel II 418 and the water inlet opening 422 of the large cavity when replenishing the small cavity through the channel I 414, the pressurized water entering the large cavity presses an upper surface of the blocking member 416 and a lower end face of the piston at the same time to retain the blocking member 416 in a state of blocking the cylinder bottom water release hole 420. At the same time, since a stress area of the lower end face of the piston is greater than a stress area of an upper end face of the piston, a pressure difference is generated and the piston drives the whole piston rod 412 to move upwards. As shown in FIG. 5, during upward motion of the piston rod 412, since an upper surface of the blocking member 416 is pressed by the pressurized water to be retained in a state of sealing the cylinder bottom water release hole 420, the piston rod 412 moves upwards with respect to the valve rod 415 to compress the force accumulating spring 417. As shown in FIG. 6, when the force accumulating spring 417 is gradually compressed to a compression limit position, the piston rod 412 drives the valve rod 415 to move upwards, during upward motion of the valve rod 415, the blocking member 416 is pulled to move upwards to leave the cylinder bottom water release hole 420, the pressurized water entering the large cavity is discharged from the large cavity through the cylinder bottom water release hole 420 and the pressure in the large cavity is reduced instantly, and at the same time, as shown in FIG. 7, the force accumulating spring 417 quickly releases an elastic force to be reset, so as to enable the valve rod 415 to drive the blocking member 416 to move upwards to reach the upper end face of the blocking member 416, so as to be attached to a base plane of the piston and block the water inlet opening 422 of the large cavity. The pressurized water entering the small cavity of the lifting cylinder 41 cannot enter the large cavity and then presses the upper surface of the piston, and at this time, a pressure on the upper end face of the piston is greater than a pressure on the lower end face of the piston, a pressure difference is generated, the piston drives the whole piston rod 412 to move downward, till the piston rod 412 drives the valve rod 415 to move downward to reach the lower end face of the blocking member 416, so as to be attached to the inner surface of the cylinder bottom and block the cylinder bottom water release hole 420, thereby finishing a lifting operation cycle of jacking and resetting of the lifting cylinder 41, and the rest may be deduced by analogy, and the piston rod 412 performs a periodic lifting motion. When the piston rod 412 jacks, the pallet of the piston rod 412 drives a rear end of the upper caliper 42 to move upwards, and when the bayonet of the upper caliper 42 that is in clearance fit deflects to be engaged with the locking channel 21 due to the upward motion of the rear end of the upper caliper 42, the upper caliper 42 and the locking-type reel 2 are driven by the piston rod 412 as a whole to move upwards to enable the locking-type reel 2 to rotate about the axle center of the reel rotation shafts 24, so as to realize rollback, and during rollback of the locking-type reel 2, the locking channel 21 slides with respect to the bayonet of the lower caliper 43 due to the gravity of the lower caliper 43, that is, the lower caliper 43 does not roll back following the locking-type reel 2. When the piston rod 412 is reset, due to the gravity, the upper caliper 42 slides downwards to an initial position along the locking channel 21 following the pallet of the piston rod 412, and the lower caliper 43 is in a state of being engaged with the locking channel 21 to prevent the locking-type reel 2 from reversing; the rest may be deduced by analogy to realize the stepwise rollback of the locking-type reel 2, and when the sprinkler support mechanism 33 regresses to the initial position, the whole sprinkling irrigation process is finished and the pressurized hydrant is closed.

To prevent impurities in the used pressurized water from causing a block in the lifting cylinder 41, in a further improved solution of the present invention, the water inlet opening 419 is connected to and is in communication with the other output end of the pressurized water axial end input joint 32 through a pipeline and a filter.

To manufacture and process conveniently, in a further improved solution of the present invention, the water inlet opening 422 of the large cavity, the valve rod 415, and the cylinder bottom water release hole 420 are coaxially disposed at a position of an axial line of the piston rod 412, and the channel II 418 is disposed between the channel I 414 and the piston.

To control the pressure and flow of the water for sprinkling irrigation conveniently, in a further improved solution of the present invention, a pressure gauge and a flow adjustment valve 32b are disposed at an input end of the pressurized water axial end input joint 32.

When the sprinkler support mechanism 33 regresses to the initial position, to prevent the locking-type reel 2 from further rolling back to damage a device, in a further improved solution of the present invention, the stepwise driving apparatus 4 further includes a rollback automatic stopping mechanism, the rollback automatic stopping mechanism includes a limiting swing retaining frame 45, a transmission connecting rod or a wire rope, and a swing holding rod 46, the limiting swing retaining frame 45 is hingedly connected to and mounted at a front end of the chassis 1 horizontally in a left-to-right direction, a rod body of the swing holding rod 46 is hingedly connected to and mounted at the rear end of the chassis 1 corresponding to a position between the upper caliper 42 and the lower caliper 43, a rear end of the limiting swing retaining frame 45 is connected to a front end of the rod body of the swing holding rod 46 through the transmission connecting rod or the wire rope, and reset springs 451 are disposed both between the limiting swing retaining frame 45 and the chassis 1 and between the rod body of the swing holding rod 46 and the chassis 1. When the sprinkler support mechanism 33 regresses to the initial position, the sprinkler support mechanism 33 knocks the limiting swing retaining frame 45, the limiting swing retaining frame 45 rotates along the hinged shaft 36c to swing and pulls and swings the swing holding rod 46 through the transmission connecting rod or the wire rope, so that the swing holding rod 46 also rotates along the hinged shaft 36c to swing, a rear end of the swing holding rod 46 swings to lift to hold the upper caliper 42, so that the upper caliper 42 is separated from the pallet of the piston rod 412, and the locking-type reel 2 stops rollback.

To prevent a scattered or stacked phenomenon of the sprinkling irrigation PE hose caused by a disorderly winding sequence of the sprinkling irrigation PE hose during a rollback process of the locking-type reel 2, in a further improved solution of the present invention, the sprinkling irrigation apparatus 3 further includes a pipe row mechanism 35, and the pipe row mechanism 35 includes a forward and backward 8-shaped spiral shaft 35a and a pipe row sleeve 35b; the forward and backward 8-shaped spiral shaft 35a is set at a front end of the chassis 1 horizontally in a left-to-right direction and is located above the holding beam, and the forward and backward 8-shaped spiral shaft 35a is connected to chains of the reel rotation shafts 24 of the locking-type reel 2 in a transmission manner through a transmission chain 50; the pipe row sleeve 35b is sleeved over the forward and backward 8-shaped spiral shaft 35a, and the output end of the sprinkling irrigation PE hose passes through a U-shaped connection member disposed on the pipe row sleeve 35b to be connected to and in communication with a bottom end of the sprinkler connection hose on the sprinkler 34.

To further prevent a scattered or stacked phenomenon of the sprinkling irrigation PE hose during a rollback process of the locking-type reel 2, in a further improved solution of the present invention, the sprinkling irrigation apparatus 3 further includes a pressurized pipe mechanism 36, the pressurized pipe mechanism 36 includes a pressurized pipe frame 36a and a tension spring 36b; the pressurized pipe frame 36a is a portal frame structure, a width size of the portal frame structure fits in with a length size of the cylinder 22 of the locking-type reel 2 and the portal frame structure is clamped between the two wing plates 23 of the locking-type reel 2, and a bottom end of the pressurized pipe frame 36a is hingedly connected to and mounted on two side walls of the chassis 1 in a left-to-right direction; one end of the tension spring 36b is connected to the portal frame structure of the pressurized pipe frame 36a and the other end is connected to a side wall of the chassis, and the tension spring 36b can make the pressurized pipe frame 36a always press against the cylinder 22 of the locking-type reel 2.

Since rollback driven by the water turbine may cause a change of an angular velocity due to a change of a quantity of layers of the sprinkling irrigation PE hose wound on the locking-type reel, to realize uniform rollback of the sprinkling irrigation PE hose, in a further improved solution of the present invention, a flow adjustment valve 32b is disposed on the pressurized water input joint of the water turbine box 31, the pressurized pipe mechanism 36 is disposed behind the locking-type reel 2, and a hinged shaft 36c at the bottom end of the pressurized pipe frame 36a is connected to the flow adjustment valve 32b through a connection rod mechanism 36d. During a process that the sprinkling irrigation PE hose is rewound on the locking-type reel 2, the pressurized pipe frame 36a has a hinging angle changed due to a change of a quantity of layers of the sprinkling irrigation PE hose rewound on the reel, and the hinged shaft 36c at the bottom end of the pressurized pipe frame 36a can control an opening degree of the flow adjustment valve 32b through a connection rod mechanism 36d, thereby realizing uniform rollback of the sprinkling irrigation PE hose.

For sprinkling irrigation of a lawn, to simplify the setting of the mechanism, in an implementation of the sprinkler support mechanism 33 of the present invention, the sprinkler support mechanism 33 is a holding plate structure that is horizontal or leans forward. The base plane of the pallet structure contacts the lawn directly during a rollback process of a sprinkling irrigation PE hose and directly slides on the lawn.

For sprinkling irrigation of bush, in another implementation of the sprinkler support mechanism 33 of the present invention, the sprinkler support mechanism 33 is a sprinkler wagon structure.

Pressurized water is used in the telescopic jacking stepwise rollback-type reel sprinkling irrigation machine to drive the lifting cylinder 41 to realize periodic lifting motion of the piston rod 412, so as to drive the upper caliper 42 to move up and down to be engaged with the locking channel 21 of the locking-type reel 2 intermittently, thereby driving the locking-type reel 2 to roll back intermittently to automatically reel in a sprinkling irrigation PE hose, and during an intermittent rollback process of the locking-type reel 2, the lower caliper 43 can prevent the locking-type reel from reversing. The whole structure is simple, may perform sprinkling irrigation on vegetation of a landscape architecture conveniently, and may be used flexibly and maintained easily. A water delivery pipeline does not need to be pre-buried in a sprinkling irrigation area of a landscape architecture and problems such as a spacing between sprinklers do not need to be considered. The self-moving sprinkling irrigation manner may realize horizontal and uniform distribution of water resources in sprinkled and irrigated soil in a precondition of reducing water resources, ensure uniform irrigation, reduce an amount of work of construction of a landscape architecture, and reduce construction costs, and is especially suitable for sprinkling irrigation of a landscape architecture.

What is claimed is:

1. A telescopic jacking stepwise rollback-type reel sprinkling irrigation machine comprising: a chassis and a sprinkling irrigation apparatus, wherein the chassis is a box-shaped support frame structure with a top portion, a bottom portion, and a rear portion open, a support wheel is provided at a rear end of the bottom portion of the chassis, front supports that incline toward a lower forward direction are respectively disposed on left and right sides of a front end of the bottom portion of the chassis, and a holding beam that is disposed in a horizontal direction and fixedly connected to two front supports is disposed between the two front supports; and the sprinkling irrigation apparatus comprises a sprinkling irrigation Polyethylene (PE) hose, a pressurized water axial end input joint, a sprinkler support, and a sprinkler, wherein the telescopic jacking stepwise rollback-type reel sprinkling irrigation machine further comprises a locking-type reel and a stepwise driving apparatus;

the locking-type reel comprises a cylinder, wing plates, and reel rotation shafts; the cylinder is a hollow cylindrical structure; the wing plates have a disk-shaped structure, a quantity of the wing plates is set to two, the two wing plates are coaxial with the cylinder respectively and fixedly disposed at two ends of the cylinder, a size of an outer diameter of the wing plates is greater than a size of an outer diameter of the cylinder, opposite inner surfaces of the two wing plates and an outer surface of the cylinder together form an accommodating space for the sprinkling irrigation PE hose, an outer surface of at least one wing plate further has a locking channel protruding from an outer surface of the wing plate, the locking channel is set to be a sealed ring structure along a circumferential edge position of the wing plate, and the ring structure is disposed concentrically with the wing plate; a quantity of the reel rotation shafts is set to two, the reel rotation shafts are coaxially disposed at the central positions of the two wing plates in a left-to-right symmetric mode, the reel rotation shafts have a hollow sleeve structure, and the locking-type reel is set to roll back and forth and is mounted on the chassis through the reel rotation shafts;

the pressurized water axial end input joint is a three-way structure that comprises an input end and two output ends, one output end of the pressurized water axial end input joint is coaxially fixed and mounted at an axial end of one reel rotation shaft of the locking-type reel; the sprinkling irrigation PE hose is wound on the cylinder of the locking-type reel, an input end of the sprinkling irrigation PE hose penetrates into the cylinder of the locking-type reel and is connected to and is in communication with an output end of the pressurized water axial end input joint, and the output end of the sprinkling irrigation PE hose extends out from a top of the holding beam of the chassis; the sprinkler comprises a sprinkler connection hose mounted on the sprinkler support in a vertical direction and a sprinkler head mounted at a top of the sprinkler connection hose, and a bottom end of the sprinkler connection hose of the sprinkler is connected to and is in communication with the output end of the sprinkling irrigation PE hose;

the stepwise driving apparatus comprises a lifting cylinder, an upper caliper, and a lower caliper;

the lifting cylinder is fixedly mounted at a rear end of the chassis at a position corresponding to the locking channel, and the lifting cylinder comprises a cylinder body and a piston rod; a piston integrally formed with the piston rod is disposed at a bottom end of the piston rod, a size of an outer diameter of the piston fits in with a size of an inner diameter of the cylinder body, a rod body of the piston rod fits in with a size of a cylinder mouth at a top end of the cylinder body, the piston rod is mounted inside the cylinder body and divides a cavity of the cylinder body into an upper small cavity and a lower large cavity, a water inlet opening penetrating through an outer wall of the cylinder body is formed at the top of the small cavity in a radial direction of the cylinder body, the water inlet opening is connected to and is in communication with the other output end of the pressurized water axial end input joint through a pipeline; a cylinder bottom water release seat that extends downwards is disposed on a cylinder bottom base plane of the cylinder body, a cylinder bottom water release hole that penetrates through the cylinder bottom water release seat and is in communication with the large cavity is disposed on the cylinder bottom water release seat; a pallet is disposed at a top end of the rod body of the piston rod, and a channel I that penetrates the rod body in a radial direction is disposed under the rod body of the piston rod and above the piston; a valve rod penetrates through and is disposed inside the piston rod in an axial direction of the piston rod at a position corresponding to the cylinder bottom water release hole, and the valve rod penetrates through the channel I, a guiding boss of which a size of an outer diameter is greater than that of a rod body of the valve rod is disposed at a top end of the valve rod, the guiding boss of the valve rod fits in with a size of an inner diameter of a valve rod guiding hole located above the channel I and disposed along an axial direction of the piston rod, the valve rod slidably fits in with the valve rod guiding hole through the guiding boss, a blocking member is coaxially mounted at a bottom end of the valve rod, and a size of an outer diameter of a base plane of the blocking member is greater than a size of an inner diameter of the cylinder bottom water release hole; a force accumulating spring is further disposed in the valve rod guiding hole, a top end of the force accumulating spring presses against the guiding boss of the valve rod, and a bottom end presses inside the rod body of the piston rod; a large cavity water inlet opening is further disposed in a base plane of the piston at a position corresponding to the cylinder bottom water release hole, the large cavity water inlet opening is in communication with the small cavity through a channel II, a size of an inner diameter of the large cavity water inlet opening is less than a size of an outer diameter of a top plane of the blocking member, and the large cavity water inlet opening, the valve rod, and the cylinder bottom water release hole are disposed coaxially;

the upper caliper is disposed in a front-to-back direction and mounted between the lifting cylinder and the locking channel, the upper caliper comprises a bayonet portion and a pallet portion, the bayonet portion comprises a bayonet that is disposed along a left-to-right opening and clamped in the locking channel, a width size of the bayonet is in clearance fit with a thickness size of the locking channel, the pallet portion is a lengthwise plank structure disposed in a back-to-forth direction, a front end of the pallet portion is fixedly connected to the bayonet portion, and a rear end is in butt joint of the pallet of the piston rod; and a structure of the lower caliper is the same as a structure of the upper caliper and the lower caliper is located exactly below the upper caliper, the bayonet of the bayonet portion of the lower caliper is clamped on the locking channel, and a rear end of the pallet portion of the lower caliper is in butt joint of the chassis.

2. The telescopic jacking stepwise rollback-type reel sprinkling irrigation machine according to claim 1, wherein the water inlet opening is connected to and is in communication with the other output end of the pressurized water axial end input joint through a pipeline and a filter.

3. The telescopic jacking stepwise rollback-type reel sprinkling irrigation machine according to claim 2, wherein the stepwise driving apparatus further comprises a rollback automatic stopping mechanism, the rollback automatic stopping mechanism comprises a limiting swing retaining frame, a transmission connecting rod or a wire rope, and a swing holding rod, the limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

4. The telescopic jacking stepwise rollback-type reel sprinkling irrigation machine according to claim 2, wherein the sprinkling irrigation apparatus further comprises a pipe row mechanism, and the pipe row mechanism comprises a forward and backward 8-shaped spiral shaft and a pipe row sleeve; the forward and backward 8-shaped spiral shaft is set at a front end of the chassis horizontally in a left-to-right direction and is located above the holding beam, and the forward and backward 8-shaped spiral shaft is connected to contains of the reel rotation shafts of the locking-type reel in a transmission manner through a transmission chain; the pipe row sleeve is sleeved over the forward and backward 8-shaped spiral shaft, and the output end of the sprinkling irrigation PE hose is in communication with a bottom end of the sprinkler connection hose on the sprinkler.

5. The telescopic jacking stepwise rollback-type reel sprinkling irrigation machine according to claim 2, wherein the sprinkling irrigation apparatus further comprises a pressurized pipe mechanism, the pressurized pipe mechanism comprises a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction; one end of the tension spring is connected to the portal frame structure of the pressurized pipe frame and the other end is connected to a side wall of the chassis.

6. The telescopic jacking stepwise rollback-type reel sprinkling irrigation machine according to claim 5, wherein a flow adjustment valve is disposed on the pressurized water axial end input joint of a water turbine box, the pressurized pipe mechanism is disposed behind the locking-type reel, and a hinged shaft at the bottom end of the pressurized pipe frame is connected to the flow adjustment valve through a connection rod mechanism.

7. The telescopic jacking stepwise rollback-type reel sprinkling irrigation machine according to claim 1, wherein the large cavity water inlet opening, the valve rod, and the cylinder bottom water release hole are coaxially disposed at a position of an axial line of the piston rod, and the channel II is disposed between the channel I and the piston.

8. The telescopic jacking stepwise rollback-type reel sprinkling irrigation machine according to claim 7, wherein the stepwise driving apparatus further comprises a rollback automatic stopping mechanism, the rollback automatic stopping mechanism comprises a limiting swing retaining frame, a transmission connecting rod or a wire rope, and a swing holding rod, the limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

9. The telescopic jacking stepwise rollback-type reel sprinkling irrigation machine according to claim 7, wherein the sprinkling irrigation apparatus further comprises a pipe row mechanism, and the pipe row mechanism comprises a forward and backward 8-shaped spiral shaft and a pipe row sleeve; the forward and backward 8-shaped spiral shaft is set at a front end of the chassis horizontally in a left-to-right direction and is located above the holding beam, and the forward and backward 8-shaped spiral shaft is connected to contains of the reel rotation shafts of the locking-type reel in a transmission manner through a transmission chain; the pipe row sleeve is sleeved over the forward and backward 8-shaped spiral shaft, and the output end of the sprinkling irrigation PE hose is in communication with a bottom end of the sprinkler connection hose on the sprinkler.

10. The telescopic jacking stepwise rollback-type reel sprinkling irrigation machine according to claim 7, wherein the sprinkling irrigation apparatus further comprises a pressurized pipe mechanism, the pressurized pipe mechanism comprises a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction; one end of the tension spring is connected to the portal frame structure of the pressurized pipe frame and the other end is connected to a side wall of the chassis.

11. The telescopic jacking stepwise rollback-type reel sprinkling irrigation machine according to claim 7, wherein the sprinkling irrigation apparatus further comprises a pressurized pipe mechanism, the pressurized pipe mechanism comprises a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction; one end of the tension spring is connected to the portal frame structure of the pressurized pipe frame and the other end is connected to a side wall of the chassis.

12. The telescopic jacking stepwise rollback-type reel sprinkling irrigation machine according to claim 1, wherein a pressure gauge and a flow adjustment valve are disposed at an input end of the pressurized water axial end input joint.

13. The telescopic jacking stepwise rollback-type reel sprinkling irrigation machine according to claim 12, wherein the stepwise driving apparatus further comprises a rollback automatic stopping mechanism, the rollback automatic stopping mechanism comprises a limiting swing retaining frame, a transmission connecting rod or a wire rope, and a swing holding rod, the limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

14. The telescopic jacking stepwise rollback-type reel sprinkling irrigation machine according to claim 12, wherein the sprinkling irrigation apparatus further comprises a pipe row mechanism, and the pipe row mechanism comprises a forward and backward 8-shaped spiral shaft and a pipe row sleeve; the forward and backward 8-shaped spiral shaft is set at a front end of the chassis horizontally in a left-to-right direction and is located above the holding beam, and the forward and backward 8-shaped spiral shaft is connected to contains of the reel rotation shafts of the locking-type reel in a transmission manner through a transmission chain; the pipe row sleeve is sleeved over the forward and backward 8-shaped spiral shaft, and the output end of the sprinkling irrigation PE hose is in communication with a bottom end of the sprinkler connection hose on the sprinkler.

15. The telescopic jacking stepwise rollback-type reel sprinkling irrigation machine according to claim 1, wherein the stepwise driving apparatus further comprises a rollback automatic stopping mechanism, the rollback automatic stopping mechanism comprises a limiting swing retaining frame, a transmission connecting rod or a wire rope, and a swing holding rod, the limiting swing retaining frame is hingedly connected to and mounted at a front end of the chassis horizontally in a left-to-right direction, a rod body of the swing holding rod is hingedly connected to and mounted at the rear end of the chassis corresponding to a position between the upper caliper and the lower caliper, a rear end of the limiting swing retaining frame is connected to a front end of the rod body of the swing holding rod through the transmission connecting rod or the wire rope, and reset springs are disposed both between the limiting swing retaining frame and the chassis and between the rod body of the swing holding rod and the chassis.

16. The telescopic jacking stepwise rollback-type reel sprinkling irrigation machine according to claim 1, wherein the sprinkling irrigation apparatus further comprises a pipe row mechanism, and the pipe row mechanism comprises a forward and backward 8-shaped spiral shaft and a pipe row sleeve; the forward and backward 8-shaped spiral shaft is set at a front end of the chassis horizontally in a left-to-right direction and is located above the holding beam, and the forward and backward 8-shaped spiral shaft is connected to contains of the reel rotation shafts of the locking-type reel in a transmission manner through a transmission chain; the pipe row sleeve is sleeved over the forward and backward 8-shaped spiral shaft, and the output end of the sprinkling irrigation PE hose is in communication with a bottom end of the sprinkler connection hose on the sprinkler.

17. The telescopic jacking stepwise rollback-type reel sprinkling irrigation machine according to claim 1, wherein the sprinkling irrigation apparatus further comprises a pressurized pipe mechanism, the pressurized pipe mechanism comprises a pressurized pipe frame and a tension spring; the pressurized pipe frame is a portal frame structure, a width size of the portal frame structure fits in with a length size of the cylinder of the locking-type reel and the portal frame structure is clamped between the two wing plates of the locking-type reel, and a bottom end of the pressurized pipe frame is hingedly connected to and mounted on two side walls of the chassis in a left-to-right direction; one end of the tension spring is connected to the portal frame structure of the pressurized pipe frame and the other end is connected to a side wall of the chassis.

18. The telescopic jacking stepwise rollback-type reel sprinkling irrigation machine according to claim 17, wherein a flow adjustment valve is disposed on the pressurized water axial end input joint of a water turbine box, the pressurized pipe mechanism is disposed behind the locking-type reel, and a hinged shaft at the bottom end of the pressurized pipe frame is connected to the flow adjustment valve through a connection rod mechanism.

19. The telescopic jacking stepwise rollback-type reel sprinkling irrigation machine according to claim 1, wherein the sprinkler support is a holding plate structure that is horizontal or leans forward.

20. The telescopic jacking stepwise rollback-type reel sprinkling irrigation machine according to claim 1, wherein the sprinkler support is a sprinkler wagon.

* * * * *